United States Patent [19]

Murphy

[11] Patent Number: 4,464,436

[45] Date of Patent: Aug. 7, 1984

[54] CHROMIC ACID-IONIC ETHYLENICALLY UNSATURATED COMPLEXES AND POLYMERS CONTAINING THE SAME

[75] Inventor: Edward J. Murphy, Mt. Prospect, Ill.

[73] Assignee: DeSoto, Inc., Des Plaines, Ill.

[21] Appl. No.: 334,919

[22] Filed: Dec. 28, 1981

[51] Int. Cl.$^3$ .................. C08F 30/04; C08F 2/50; B32B 15/08

[52] U.S. Cl. .................. 428/463; 204/159.23; 428/462; 526/241; 260/438.5 R

[58] Field of Search .................. 526/241; 260/438.5 R; 546/8; 548/107; 204/159.23; 428/463, 462

[56] References Cited

U.S. PATENT DOCUMENTS

| | | | |
|---|---|---|---|
| 2,294,525 | 1/1942 | Waugh | 260/438.5 R |
| 2,480,754 | 8/1949 | McCarthy | 260/438.5 R |
| 2,995,555 | 8/1961 | Lauver | 260/438.5 R |
| 3,954,588 | 5/1976 | Hazan et al. | 204/181 C |
| 3,997,486 | 12/1976 | Moore et al. | 526/241 |
| 4,042,544 | 8/1977 | Simon | 260/438.5 R |
| 4,187,203 | 2/1980 | Murphy | 524/204 |

FOREIGN PATENT DOCUMENTS 46-07702  2/1971  Japan .................. 526/241

*Primary Examiner*—John C. Bleutge
*Assistant Examiner*—A. H. Koeckert
*Attorney, Agent, or Firm*—Dressler, Goldsmith, Shore, Sutker & Milnamow, Ltd.

[57] ABSTRACT

An unsaturated ionic dimer of chromic acid with monoethylenically unsaturated monomer containing a single amine group is disclosed which can be incorporated into liquid coating compositions containing ultraviolet-curable polyethylenically unsaturated material. On curing, the ionic dimer increases the corrosion resistance of the photocured coatings, and is especially useful as a basecoat over thermoplastic molded objects which are coated with a metallic film.

15 Claims, No Drawings

CHROMIC ACID-IONIC ETHYLENICALLY UNSATURATED COMPLEXES AND POLYMERS CONTAINING THE SAME

DESCRIPTION

Technical Field

This invention relates to chromic acid-ionic ethylenically unsaturated complexes, to liquid ultraviolet-curing coating compositions containing these complexes, and to addition polymers containing the polymerized monomers to provide coatings having improved corrosion resistance.

Background Art

The corrosion resistance provided by polymers containing chromic acid is known, particularly from my prior U.S. Pat. No. 4,187,203 issued Feb. 5, 1980 in which a polyamide-chromic acid ionic polymer is formed by reacting a water insoluble polyamine with from about 50 to about 95 equivalent percent of chromic acid. This ionic polymer is added to aqueous cationic electrocoating baths to supply from about 25 to about 1000 parts of detectable chromate per million parts of the bath. The result is electrodeposited polymeric coatings which provide enhanced corrosion protection to substrates coated with polymers containing these ionic polymers.

It is also known to apply a basecoat to thermoplastic molded objects in order that thin metallic films may be applied more smoothly and uniformly (as by vacuum metallization). The metallized product is then protected with a clear overcoat, but on exposure to the elements, it is found that the metallic film is attacked, and the result is that delamination occurs.

In this invention, I attempted to employ the improved resistance to corrosion which I previously found was provided by polymers containing chromic acid ions to solve the problem of the delamination of metallized coatings. This attempt has led to new complexes and to polymers containing the same.

Disclosure of Invention

In accordance with this invention, I react a monoethylenically unsaturated monomer containing a single amine group with chromic acid to form an unsaturated ionic chromate dimeric complex between the two, and I incorporate a small proportion of this unsaturated ionic complex into a liquid composition containing ultraviolet-curable polyethylenically unsaturated material. Upon exposure to ultraviolet radiation, the composition cures, and the ionic complex is incorporated into the polymer which is formed to improve resistance to exterior exposure.

While polymer formation by photopolymerization is particularly contemplated, addition polymerization with other mono- and polyethylenically unsaturated materials by other known techniques, such as polymerization in organic solvent solution, aqueous emulsion, or in bulk, is also contemplated.

It is here noted that my previously referred to prior patent reacts chromic acid with a polyamine to directly form an insoluble polymer, whereas it is here intended to produce an unsaturated ionic complex and to subsequently convert that complex into a polymer by a mechanism separate from the reaction of chromic acid.

Ultraviolet-cured basecoats intended to receive thin metallic films are particularly contemplated in this invention because these thin films delaminate from the basecoat when the ionic complex is not present because the metal in the films corrodes upon exterior exposure. The presence of the ionic complexes of this invention in the basecoat improves the resistance to delamination, and these ionic complexes are incorporated into a cross-linked polymeric matrix which resists leaching. It is here noted that the ionic complex discolors the basecoat, but this is not important where the basecoat is covered by a metallic film.

Any monoethylenically unsaturated monomer containing a single amine group may be used in accordance with this invention regardless of the specific character of the ethylenically unsaturated group or the primary, secondary or tertiary character of the amine group. Thus, allylic unsaturation, as in allyl amine or methallyl amine, may be used, but acrylic or methacrylic unsaturation is preferred, especially acrylic esters of monoamino alcohols, such as 2-ethoxy amine or its dimethyl derivative. These acrylic esters are particularly preferred where the ionic monomer is intended to be incorporated into an ultraviolet-curable liquid coating composition containing polyacrylates. The term polyacrylate is here intended to denote a plurality of unsaturated acrylic ester groups, this being one accepted meaning of this term. In such ultraviolet-curable compositions, the presence of the tertiary amine group enhances the photocure and it avoids Michael addition reactions with acrylic unsaturation which can cause the production of gel particles, so tertiary amines are especially preferred. These are illustrated herein by dimethyl aminopropyl acrylamide. This preferred monomer, in a preferred reaction with chromic acid, appears to be converted to di(dimethyl aminopropyl acrylamide) chromate.

Other illustrative amines which may be used are: aminoethyl acrylate; aminopropyl methacrylate; dimethyl aminoethyl acrylate; dimethyl aminopropyl acrylate; diethyl aminopropyl methacrylate; dimethyl aminoethyl acrylamide; and dimethyl aminopropyl methacrylamide. The corresponding crotonates and itaconates are also useful.

The unsaturated amine reactant is reacted with aqueous chromic acid ($H_2CrO_4$) which provides the $CrO_4^{--}$ anion and two protons, each of which associate with an amino nitrogen atom to quaternize it and render it cationic. Since each unsaturated amine reactant contains a single amine group, the product is a complex in which two amine molecules are linked together.

It should be noted that chromic acid is difunctional, so it links together two molecules of monomer containing a single amine group. In this way any small amount of chromic acid which is added to the amine monomer will form an ionic chromate complex. Excess chromic acid should not be used since this introduces unneutralized acidity. In normal practice, chromic acid is added in an amount to neutralize from 40% to 80% of the amine present. Any unreacted amine monomer is simply consumed by polymerization to become part of the final cured polymeric product.

In preferred practice where the ionic complexes of this invention are incorporated into a polyethylenically unsaturated liquid to become part of a coating which has been cured by polymerization of the unsaturated materials present, as little as 0.1% by weight of the mixture is sufficient to provide some noticeable benefit.

About 1% by weight represents normal practice, and up to about 10% by weight may usefully be present. While these proportions illustrate normal practice, the precise amount used is not a primary feature of this invention.

Using the ultraviolet-cured basecoats particularly contemplated herein and then depositing a metallized film followed by the application of a clear topcoat, it has been found that the extensive delamination normally encountered after 100 hours of salt spray testing is entirely overcome.

When ultraviolet light is used to provide a photocure, photosensitizers, such as ketonic photosensitizers illustrated by benzophenone, are added to enhance the photocure. These are conventional and are not needed when ionizing radiation is used in place of ultraviolet light.

It is also possible to incorporate conventional free radical polymerization catalysts, such as benzoyl peroxide, and to use heat to stimulate the desired polymerization. With appropriate catalysis, polymerization will take place at a relatively low temperature, such as about 150° F.

The invention is illustrated in the Examples which follow in which all parts are by weight.

EXAMPLE 1

50 Parts (0.29 mole) of dimethyl aminopropyl methacrylamide are mixed with 59 parts of a solution of chromic acid in deionized water containing 20% $CrO_3$ and providing 0.12 mole of chromic acid. This neutralizes about 82% of the amine functionality present, and it provides 109 parts of an aqueous mixture containing a large proportion of di(dimethyl aminopropyl methacrylamide) chromate and a small proportion of unreacted dimethyl aminopropyl methacrylamide. The chromate content is about 13%.

EXAMPLE 2

The solution of Example 1 was added in an amount of 1 part to a liquid ultraviolet-curable solution to provide two test compositions A and B, as tabulated below.

|  | A | B |
|---|---|---|
| Polyacrylate-based hydroxy-functional polyester urethane | 50 | 50 |
| Pentaerythritol triacrylate | 50 | 50 |
| Dimethoxy phenol acetophenone sensitizer | 6 | 6 |
| Chromate complex of Example 1 | — | 1 |
| Methanol | 30 | 30 |
| Isopropanol | 30 | 30 |
| Butanol | 30 | 30 |

This provides two ultraviolet-curable compositions, one unmodified (A), and one with added chromate complex (B).

ABS panels were dip-coated, air dried, and ultraviolet cured in the same manner. Sputtered chrome alloy was then applied and topcoated with a commercial urethane coating (clear). After 100 hours of salt spray testing, coated products with coating A showed severe metal delamination. In contrast, coated products with coating B containing the chromate complex showed no delamination at all.

In the foregoing Examples, the polyacrylate based on hydroxy-functional polyester urethane is made from a polyester of adipic acid and propylene glycol having a molecular weight of 100 and an hydroxyl equivalent weight of 500 which has been reacted with excess aliphatic diisocyanate and then with hydroxyethyl acrylate. Uvithane 788, a product of Thiokol, may be used. Various commercial polyacrylates, both urethane products and those without urethane linkages, can be used to provide an ultraviolet curable liquid coating composition.

Also, dimethoxy phenol acetophenone from any source may be used, such as Irgacure 651, which is a product of Ciba Geigy. Ultraviolet light sensitizers for curing liquid unsaturated coatings are conventional and are commonly ketonic in nature. These sensitizers are unchanged in this invention, except that the quaternary amines added herein can be expected to speed the photocure.

It is lastly pointed out that the applied compositions must be liquid, and in this Example, the alcoholic solvents provide this liquidity. These solvents are largely removed by evaporation before ultraviolet light exposure is applied to cause the photocure to occur.

EXAMPLE 3

50 Parts (0.31 mole) of dimethyl aminoethyl methacrylate are mixed with 59 parts of a solution of chromic acid in deionized water containing 20% $CrO_3$ and providing 0.12 mole of chromic acid. This neutralizes about 77% of the amine functionality present, and it provides a solution which is useful in the same way illustrated in Example 2, composition B to provide corresponding results.

EXAMPLE 4

50 Parts (0.29 mole) of dimethyl aminopropyl methacrylamide are mixed with 58 parts of a solution of chromic acid in deionized water containing 10% $CrO_3$ and providing 0.058 mole of chromic acid. This neutralizes about 40% of the amine functionality present, and it provides a solution which is useful in the same way illustrated in Example 2, composition B to provide corresponding results.

EXAMPLE 5

Example 2, composition B is modified by removing the sensitizer and replacing it with 2 parts of benzoyl peroxide. The resulting coating composition is curable by baking.

Since ultraviolet light is not used in this Example, the coating composition can be pigmented.

The compositions of these examples can also be applied to metal substrates and cured appropriately to provide a protective coating in which the complex of this invention improves the resistance to corrosion. The use of benzoyl peroxide to provide the desired addition polymerization is particularly desirable for this purpose.

What is claimed is:

1. An unsaturated ionic complex of chromic acid with monoethylenically unsaturated monomer containing a single amine group.

2. An ionic complex as recited in claim 1 in which said monomer is a tertiary amine.

3. An ionic complex as recited in claims 1 or 2 in which said monomer is an acrylate.

4. An ionic complex as recited in claim 3 in which said chromic acid is used in an amount to neutralize from 40% to 85% of the amine present.

5. A liquid coating composition containing ultraviolet-curable polyethylenically unsaturated material in admixture with the ionic complex of claim 3.

6. A coating composition as recited in claim 5 in which said composition further includes a ketonic photosensitizer.

7. A coating composition as recited in claim 6 in which said photosensitizer is benzophenone.

8. A coating composition as recited in claim 6 in which from about 0.1% to about 10% by weight of said ionic complex is present.

9. A coating composition as recited in claim 8 in which said polyethylenically unsaturated material is a polyacrylate.

10. A liquid coating composition containing polyethylenically unsaturated material in admixture with the ionic complex of claims 1, 2 or 3 and a thermally initiated free radical polymerization catalyst.

11. A cured coating comprising an addition polymer containing copolymerized units of the ionic complex of claim 1.

12. A photocured coating comprising photopolymerized polyethylenically unsaturated material having copolymerized therewith from 0.1% to 10% by weight of the ionic complex of claims 1, 2 or 3.

13. A photocured coating as recited in claim 12 in which said polyethylenically unsaturated material is a polyacrylate.

14. A molded thermoplastic object base coated with the photocured coating of claim 11 which has deposited thereon a metallic film.

15. A metal substrate coated with polyethylenically unsaturated material cured by addition polymerization in the presence of the complex of claim 1.

* * * * *